Dec. 11, 1951  H. A. BENDFELT  2,578,123
FILM TENSIONING APPARATUS
Filed Aug. 9, 1946  2 SHEETS—SHEET 1
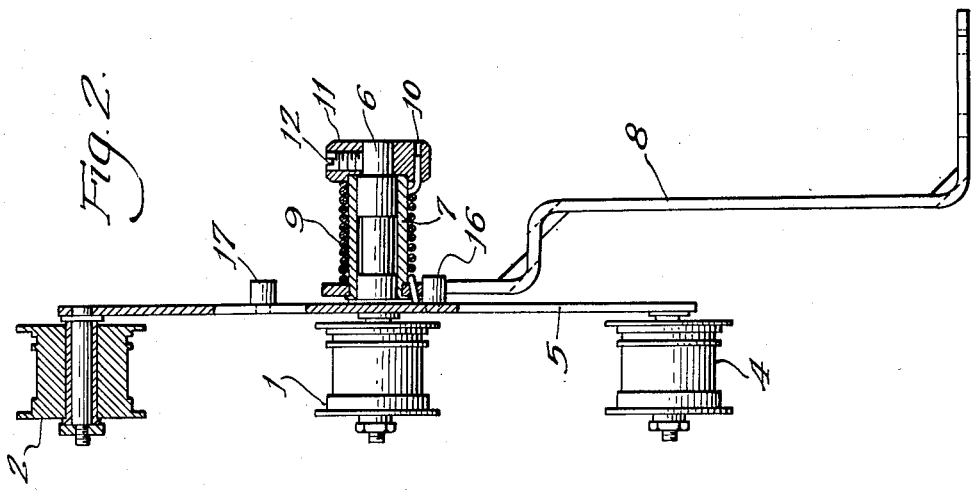
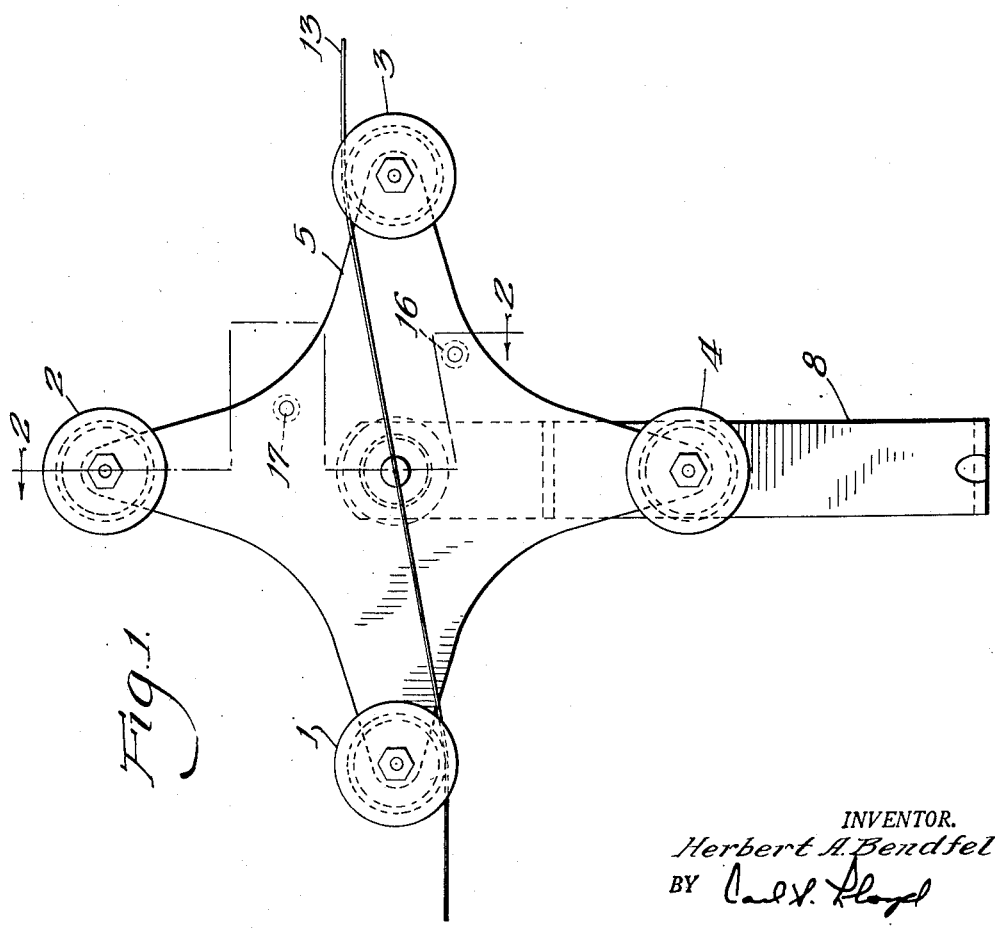
INVENTOR.
Herbert A. Bendfelt
BY
Attorney

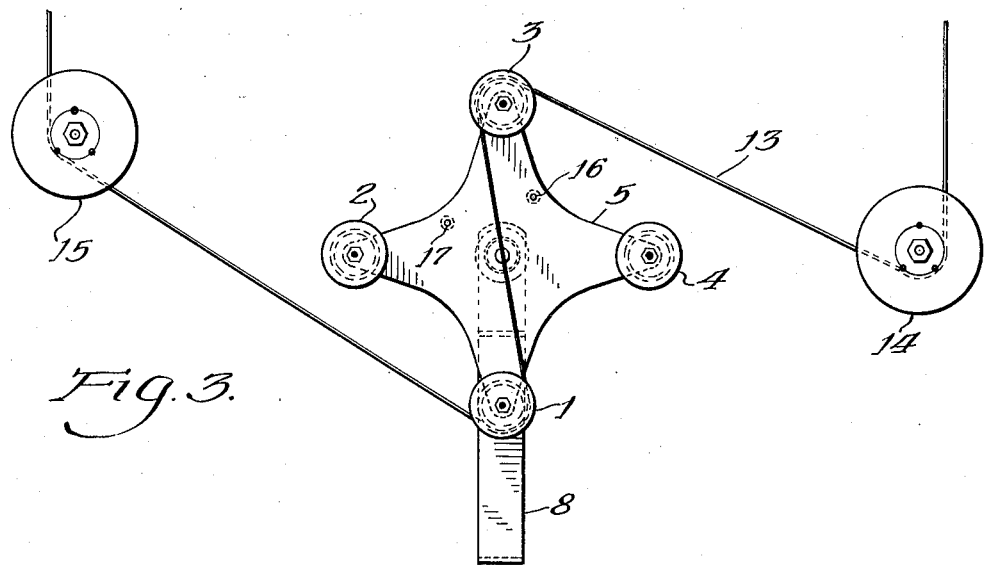
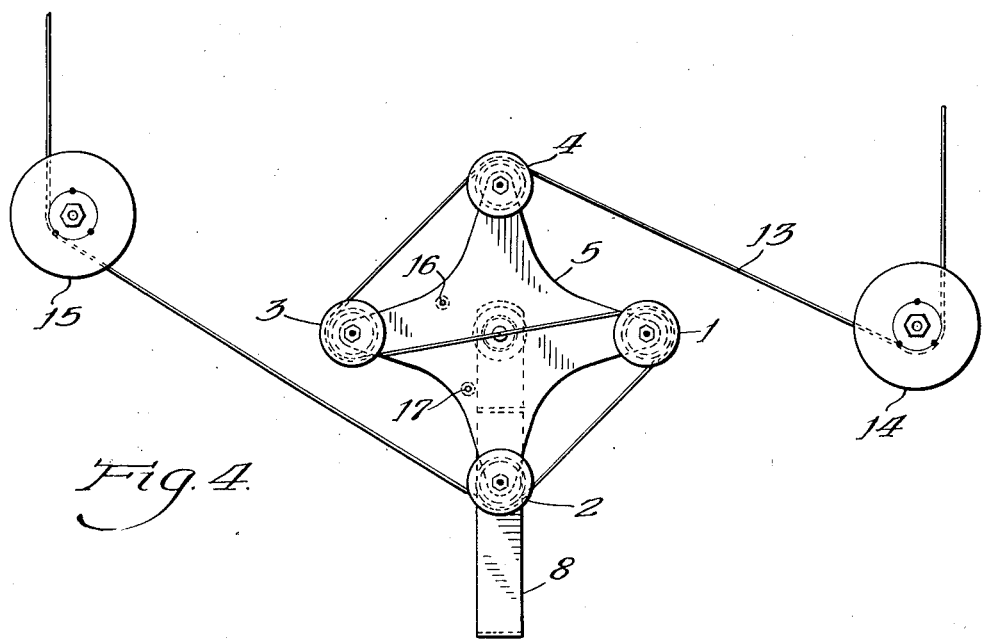

Patented Dec. 11, 1951

2,578,123

UNITED STATES PATENT OFFICE 2,578,123

FILM TENSIONING APPARATUS

Herbert A. Bendfelt, Oak Park, Ill., assignor to Mills Industries, Incorporated, Chicago, Ill., a corporation of Illinois Application August 9, 1946, Serial No. 689,582

5 Claims. (Cl. 242—155)

My invention relates to a device for maintaining motion picture film or the like in a state of constant tension and may be embodied in an attachment to a motion picture projector serving to maintain this tension on the film as it leaves the projector. It is, however, also adaptable for use at other points or in connection with other film handling apparatus, as, for example, film developing machines and film inspection and repair machines.

Most modern manually and remotely controlled motion picture projectors of both the reel to reel and continuous reel types are equipped with a film safety switch which is held in a closed position by the tension of the film leaving the projector, the purpose of the switch being to break the projector circuit and stop the machine if the film should break, shake loose from or back off of the take-up reel. This safety switch prevents the tangling of film and consequent damage which would result if the projector should continue to turn after such mishap has occurred.

Frequently in the operation of a motion picture projector a comparatively small amount of film shakes loose or backs off of the take-up reel, the amount of slack formed being harmless if not allowed to tangle. Nevertheless, the film safety switch is opened by the formation of this slack and the projector stops. Furthermore, in the operation of a continuous reel type of projector under adverse conditions such as high temperature and humidity and inferior or dirty film, the film leading from the projector back to the outside of the continuous reel varies considerably in tension and sometimes a jerking action on the film results. Both of these occurrences, although harmless to both the film and the projector, cause the film safety switch to open and needlessly stop the projector.

To prevent the above mentioned safety switch from opening at undesired times, it is obvious that a uniform tension must be applied at all times to the film passing over the safety switch. Further, it is desirable to maintain a constantly uniform tension in the film as it passes from the projector to the take-up reel in order for the reel to wind the film at a uniform and correct tightness.

To satisfy the above mentioned desirable characteristics of good motion picture projector operation and to overcome the above described difficulties in prior constructions I have devised the present film tensioning device, the principal object of which is to maintain a constant and uniform tension on the film on both reel to reel and continuous reel types of projectors throughout the film's travel from the projector to the take-up reel.

A further object of the invention is to provide in such a tensioning device the means for taking up slack in the film and releasing it, maintaining constant tension on the film on both the entering and leaving sides of the device and within the device throughout the operation.

A further object of the invention is to provide a small and compact means for maintaining tension on motion picture film which will expose the minimum amount of the film to dust and dirt and at the same time avoid as many bends in the film as possible during normal operation, avoid all sharp bends in the film, and minimize the friction between the film and the tensioning device.

Other objects and advantages of the invention will be apparent from the following description of a preferred embodiment thereof, taken in connection with the accompanying drawings, in which:

Fig. 1 is a front plan view of the device as it appears during the greater period of its operation;

Fig. 2 is a side view, partly in section taken substantially on the line 2—2 in Fig. 1;

Fig. 3 is a front plan view of the device as it appears after having taken up approximately one-half of its film slack capacity; and Fig. 4 is a front plan view of the device as it appears after having taken up substantially its full capacity of film slack.

In the said drawings, a star wheel 5, upon which are mounted freely rotatable rollers 1, 2, 3 and 4, is securely fastened on a shaft 6. The shaft 6 rotates freely in a tubular bearing 7 which is securely mounted to a mounting bracket 8. Around the bearing 7 is located a torsion spring 9, one end of which is securely fastened to the mounting bracket 8 and the other end of which extends into a hole 10 in a knurled nut 11. The knurled nut 11 is fastened to the shaft 6 by means of a set screw 12.

The device may be mounted at any convenient point in the path of the film 13 between the film outlet of the projector and the take-up reel (not shown). As diagrammatically shown in Figs. 3 and 4, it is mounted between two guide rolls 14 and 15 which may be assumed to be suitably positioned in the film handling apparatus.

After the device has been securely mounted, it is prepared for use by turning the star wheel 5 in a clockwise direction until a stop 16 mounted on the back side of the star wheel 5 strikes the mounting bracket 8, this turning motion being resisted by the torsion spring 9. The film 13 is then placed over the roller 3 and under the roller 1 as illustrated in Fig. 1. In this condition the star wheel 5 with its four rollers 1, 2, 3 and 4 has a tendency to rotate counter-clockwise due to the action of the torsion spring 9. The film 13 coming from the projector and going to the take-up reel passes the star wheel 5 and rides over the roller 3 and under the roller 1. Because of the tendency for the star wheel 5 to rotate counter-clockwise, as above described, the roller 3 pushes up on the film 13 and the roller 1 pushes down on said film, thus creating a tension in said film, the amount of which is determined at will by releasing the set screw 12, turning the knurled nut 11 a desired amount on the shaft 6, and again tightening the set screw 12, thus changing the torsion in the spring 9.

It is obvious from the above description and from the drawings that in addition to maintaining a predetermined tension in the film 13, the star wheel 5 will tend to turn counter-clockwise until the stop 17 mounted on the back side of the star wheel 5 strikes the mounting bracket 8, thereby taking up any slack in the film 13 which may occur. It is also obvious that a change in the direction of the film passing through the device will in no way effect the operation of the device.

Fig. 3 illustrates the position of the device after it has taken up approximately one-half of its film slack capacity. Because of the action of the torsion spring 9, the star wheel 5 has turned counter-clockwise approximately ninety degrees, the tension on the film 13 remaining constant.

Fig. 4 shows the position of the device after it has taken up substantially all of its film slack capacity, the action of the torsion spring 9 having caused the star wheel 5 to turn counter-clockwise approximately one hundred and eighty degrees so that the film 13 rides over the roller 4 and under the roller 2 as well as around the rollers 1 and 3, the tension of the film still remaining practically constant.

As the film 13 continues to pass through the device, the slack held by the device will gradually be taken up by the take-up reel on the film projector and the star wheel 5 will return toward its normal operating position as illustrated in Fig. 1, the position of said star wheel at any given time depending upon the amount of slack in the film.

The foregoing detailed description has been given for clearness of understanding only and no unnecessary limitations should be understood therefrom, but the appended claims should be construed as broadly as permissible in view of the prior art.

I claim:

1. A film tensioning device comprising a rotatably mounted star wheel, a support on which said wheel is rotatably mounted, spring means tending to rotate said wheel in one direction, and four film engaging rollers on the points of said star wheel engageable with the film in a path of travel of the latter with the film contacting opposite sides of opposed rollers in such manner that tension of the film tends to rotate the wheel in direction opposite to that in which said spring means tends to rotate the same, whereby said opposed forces maintain the film under constant tension and take up slack occurring therein, said wheel being so positioned and arranged in the path of travel of the film that the film normally engages only two of the rollers thereon and engages the remaining rollers only after rotation of the wheel substantially beyond a quarter turn in tensioning direction upon infrequent occasions when an extreme slack condition develops in the film.

2. A film tensioning device comprising a rotatably mounted star wheel, a support on which said wheel is rotatably mounted, adjustable spring means tending to rotate said wheel in one direction, and four film engaging rollers on the points of said star wheel engageable with the film in a path of travel of the latter with the film contacting opposite sides of opposed rollers in such manner that tension of the film tends to rotate the wheel in direction opposite to that in which said spring means tends to rotate the same, whereby said opposed forces maintain the film under constant tension and take up slack occurring therein, said wheel being so positioned and arranged in the path of travel of the film that the film normally engages only two of the rollers thereon and engages the remaining rollers only after rotation of the wheel substantially beyond a quarter turn in tensioning direction upon infrequent occasions when an extreme slack condition develops in the film.

3. A film tensioning device comprising a rotatably mounted star wheel, a support on which said wheel is rotatably mounted, travel stops for limiting the rotation of said wheel, spring means tending to rotate said wheel in one direction, and four film engaging rollers on the points of said star wheel engageable with the film in a path of travel of the latter with the film contacting opposite sides of opposed rollers in such manner that tension of the film tends to rotate the wheel in direction opposite to that in which said spring means tends to rotate the same, whereby said opposed forces maintain the film under constant tension and take up slack occurring therein, said travel stops being carried by said wheel and being respectively arranged thereon to engage said support at the opposite limits of the rotation of the wheel, the wheel, when rotated by said spring means to the maximum extent, causing the film to pass forward, backward and then forward again around all the rollers on the wheel, thereby taking up slack in the film of length substantially in excess of the circumference of the wheel, said wheel being so positioned and arranged in the path of travel of the film that the film normally engages only two of the rollers thereon and engages the remaining rollers only after rotation of the wheel substantially beyond a quarter turn in tensioning direction upon infrequent occasions when an extreme slack condition develops in the film.

4. A film tensioning device comprising a rotatably mounted star wheel, a support on which said wheel is rotatably mounted, spring means tending to rotate said wheel in one direction, a pair of film engaging rollers disposed respectively on opposite extremities of said wheel, and a second pair of film engaging rollers disposed respectively on other opposed extremities of said wheel, the first of said pairs of rollers being engageable with the film in the path of travel of the latter with said film contacting opposite sides of said rollers in such manner that tension of said film tends to rotate the wheel in direction opposite to that of the rotation tended to be induced by said spring, and the second pair of said rollers being engageable with said film upon a predetermined rotation of said wheel, whereby the opposed forces of said spring and the tension of said film maintain the film under constant tension and take up slack occurring therein, said wheel being so positioned and arranged in the path of travel of the film that the film normally engages only two of the rollers thereon and engages the remaining rollers only after rotation of the wheel substantially beyond a quarter turn in tensioning direction upon infrequent occasions when an extreme slack condition develops in the film.

5. A film tensioning device comprising a rotatably mounted star wheel, a support on which said wheel is rotatably mounted, spring means tending to rotate said wheel in one direction, a pair of film engaging rollers disposed respectively on opposite extremities of said wheel, and a second pair of film engaging rollers disposed respectively on other opposed extremities of said wheel and on a line substantially at right angles to a line passed through said first pair of rollers, the first of said pairs of rollers being engageable with the film in the path of travel of the latter with said film contacting opposite sides of said rollers in such manner that tension of said film tends to rotate the wheel in direction opposite to that of the rotation tended to be induced by said spring, and the second pair of said rollers being engageable with said film upon a predetermined rotation of said wheel, whereby the opposed forces of said spring and the tension of said film maintain the film under constant tension and take up slack occurring therein, said wheel being so positioned and arranged in the path of travel of the film that the film normally engages only two of the rollers thereon and engages the remaining rollers only after rotation of the wheel substantially beyond a quarter turn in tensioning direction upon infrequent occasions when an extreme slack condition develops in the film.

HERBERT A. BENDFELT.

REFERENCES CITED

The following references are of record in the file of this patent:

UNITED STATES PATENTS

| Number | Name | Date |
|---|---|---|
| 2,193,044 | Sibley | Mar. 12, 1940 |

FOREIGN PATENTS

| Number | Country | Date |
|---|---|---|
| 22,908 | Switzerland | Nov. 16, 1900 |
| 568,015 | France | Dec. 15, 1923 |